United States Patent
Furuse et al.

(10) Patent No.: US 11,981,179 B2
(45) Date of Patent: May 14, 2024

(54) SUSPENSION

(71) Applicant: SUBARU CORPORATION, Tokyo (JP)

(72) Inventors: Tomohiro Furuse, Tokyo (JP); Ryuma Mine, Tokyo (JP); Koichi Uchikawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/974,736

(22) Filed: Oct. 27, 2022

(65) Prior Publication Data

US 2023/0150326 A1 May 18, 2023

(30) Foreign Application Priority Data

Nov. 17, 2021 (JP) .................................. 2021-187147

(51) Int. Cl.
*B60G 7/00* (2006.01)
*B60G 3/22* (2006.01)

(52) U.S. Cl.
CPC ............... *B60G 7/001* (2013.01); *B60G 3/22* (2013.01)

(58) Field of Classification Search
CPC . B60G 7/001; B60G 3/22; B60G 7/04; B60G 2204/4104; B60G 2204/41042; F16F 1/38; F16F 1/3807; F16F 1/3821
See application file for complete search history.

(56) References Cited

U.S. PATENT DOCUMENTS

| 4,754,992 A * | 7/1988 | Asanuma | ............... | B60G 7/001 |
| | | | | 280/124.135 |
| 2019/0054786 A1* | 2/2019 | Hester | ...................... | B60G 7/02 |

FOREIGN PATENT DOCUMENTS

| JP | S6057409 U | * | 4/1985 |
| JP | H05-44162 Y2 | | 11/1993 |
| JP | H07190132 A | * | 7/1995 |
| JP | 2000-118220 A | | 4/2000 |
| JP | 2000118220 A | * | 4/2000 |
| KR | 19980054875 U | * | 10/1998 |

OTHER PUBLICATIONS

JP-2000118220-A Machine English translation (Year: 2000).*
KR19980054875 Machine English translation (Year: 1998).*
JPS6057409U Machine English translation (Year: 1985).*
JPH07190132A Machine English translation (Year: 1995).*

* cited by examiner

*Primary Examiner* — Jason D Shanske
*Assistant Examiner* — Matthew James O'Neill
(74) *Attorney, Agent, or Firm* — MCGINN I.P. LAW GROUP, PLLC

(57) ABSTRACT

A suspension includes a housing, links, a radius arm, and a radius arm bush. The radius arm bush is provided on a front end of the radius arm, couples the radius arm to a vehicle body, with an elastic body in between, and is disposed vehicle-widthwise inwardly of a wheel center contact point of the rear wheel. The radius arm bush has higher rigidity with respect to turn of the radius arm with respect to the vehicle body in a direction in which an underside of the radius arm is displaced vehicle-widthwise outwardly from an upside of the radius arm, than rigidity with respect to turn of the radius arm with respect to the vehicle body in a direction in which the underside of the radius arm is displaced vehicle-widthwise inwardly from the upside of the radius arm.

16 Claims, 5 Drawing Sheets

SUSPENSION

CROSS-REFERENCE TO RELATED APPLICATIONS

The present application claims priority from Japanese Patent Application No. 2021-187147 filed on Nov. 17, 2021, the entire contents of which are hereby incorporated by reference.

BACKGROUND

The disclosure relates to a suspension for a vehicle such as an automobile.

Vehicles such as automobiles are provided with suspensions. A suspension includes a hub bearing housing and suspension links. In the following, the hub bearing housing is simply referred to as a housing. The housing rotatably supports a wheel. The housing is strokably coupled to a vehicle body by the suspension links.

An end of the suspension link, i.e., a node, is swingably coupled to the housing or the vehicle body, with an elastic member such as a cylindrical rubber bush in between.

As an existing technique related to a suspension including an elastic member, Japanese Unexamined Patent Application Publication (JP-A) No. 2000-118220 describes an independent suspension including a trailing arm. On a front end of the trailing arm, a cylindrical rubber bush is provided. The rubber bush has a pair of voids. The voids are disposed, with a rearwardly inclined angle with respect to a vehicle longitudinal direction. This leads to a more comfortable ride and enhanced operation stability.

Japanese Utility Model Gazette (JP-Y2) No. H05-44162 describes a technique in which a front end of a swing arm is attached to a vehicle body, with a rubber bush in between. The swing arm protrudes forward from a rear wheel support to which a rear wheel is attached.

The rubber bush has a front void and a rear void. In the rubber bush, an upper metal plate and a lower metal plate are embedded. This causes a difference between longitudinal and vertical elastic support characteristics of the rubber bush.

SUMMARY

An aspect of the disclosure provides a suspension including a housing, links, a radius arm, and a radius arm bush. To the housing, a hub bearing is attached. The hub bearing rotatably supports a rear wheel of a vehicle. The links each include both ends spaced apart in a vehicle widthwise direction. The links each couple the housing to a vehicle body of the vehicle. The radius arm is unitized with the housing and protrudes from the housing toward front of the vehicle. The radius arm bush is provided on a front end of the radius arm. The radius arm bush couples the radius arm to the vehicle body, with an elastic body in between. The radius arm bush is disposed vehicle-widthwise inwardly of a wheel center contact point of the rear wheel. The radius arm bush has higher rigidity with respect to turn of the radius arm with respect to the vehicle body in a direction in which an underside of the radius arm is displaced vehicle-widthwise outwardly from an upside of the radius arm, than rigidity with respect to turn of the radius arm with respect to the vehicle body in a direction in which the underside of the radius arm is displaced vehicle-widthwise inwardly from the upside of the radius arm.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
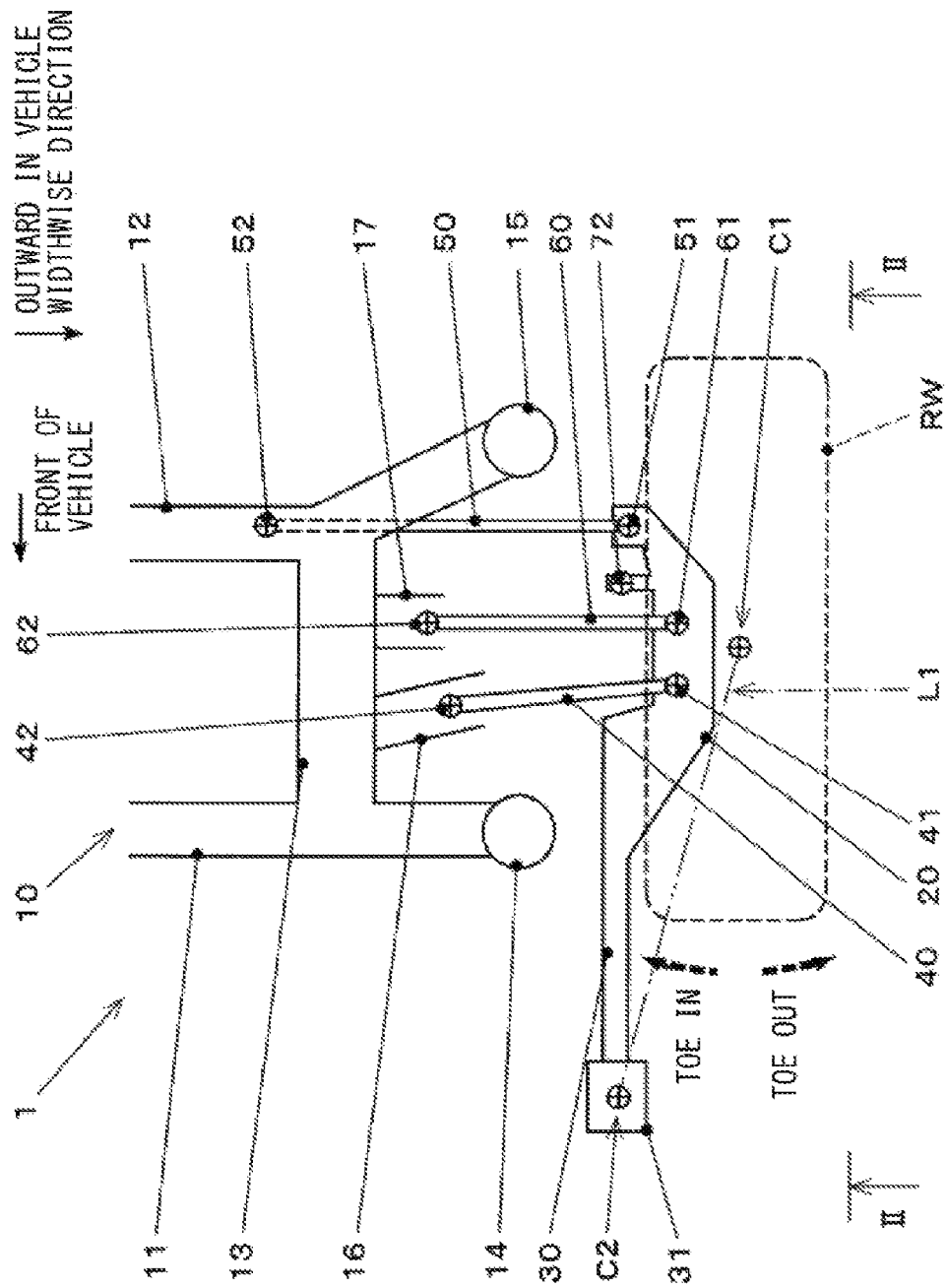
FIG. 1 is a schematic plan view of a suspension according to an embodiment of the disclosure, as viewed from above.

Researches have been made to enhance operation stability by means of characteristics or arrangement of components of a suspension. Most of such researches have focused on a steady state after settlement of a response to a steering operation at an initial stage of cornering.

However, in terms of evaluation of vehicle controllability when a driver actually drives a vehicle, it is significant to notice a steering response in a transient response state before the steady state.

Let us focus on behavior of a rear suspension at a start of cornering. First, the behavior of the rear suspension is influenced by vertical force steering, i.e., a toe change corresponding to variations in a vertical load on a tire. In this region, a shock absorber sticks because of friction, and does not make any stroke.

For example, in a known radius arm suspension, a front end of a radius arm is attached to a vehicle body, with a radius arm bush in between. The radius arm is unitized with a housing and protrudes forward from the housing.

A radius arm suspension often has geometry in which a radius arm bush is disposed vehicle-widthwise inwardly of a wheel center contact point of a rear wheel with a road surface.

In such geometry, as a vertical load on a tire increases, the radius arm and the whole housing makes a torsional turn in a direction in which an underside of the radius arm is displaced vehicle-widthwise outwardly from an upside of the radius arm.

In this case, the rear wheel may sometimes exhibit the following behavior. First, the rear wheel tends to toe out because of vertical force steering, and thereafter, the rear wheel returns to a toe-in direction by roll steering, i.e., a toe change in accordance with a suspension stroke.

As described, there is a time delay between a start of cornering and the time when the toe change in the toe-in direction occurs in the rear wheel on outer side of the cornering. A long time delay may cause lowered vehicle controllability.

It is desirable to provide a suspension that makes it possible to enhance responsiveness at an initial stage of cornering.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A suspension according to one embodiment of the disclosure may be, for example, a rear suspension that supports a rear wheel of an automobile such as a passenger car.

FIG. 1 is a schematic plan view of the suspension of the embodiment, as viewed from above.

Figure 2:
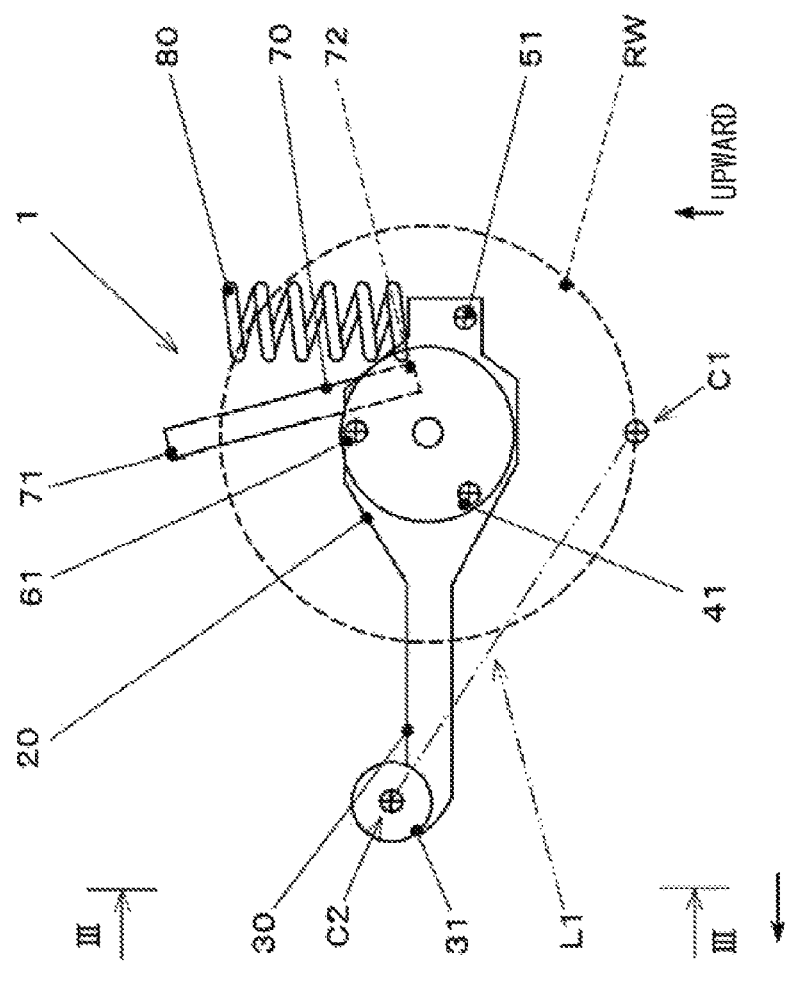
FIG. 2 is a schematic side view of the suspension according to the embodiment, as viewed from sideways of a vehicle.

FIG. 2 is a schematic side view of the suspension of the embodiment, as viewed from sideways of a vehicle.

Figure 3:
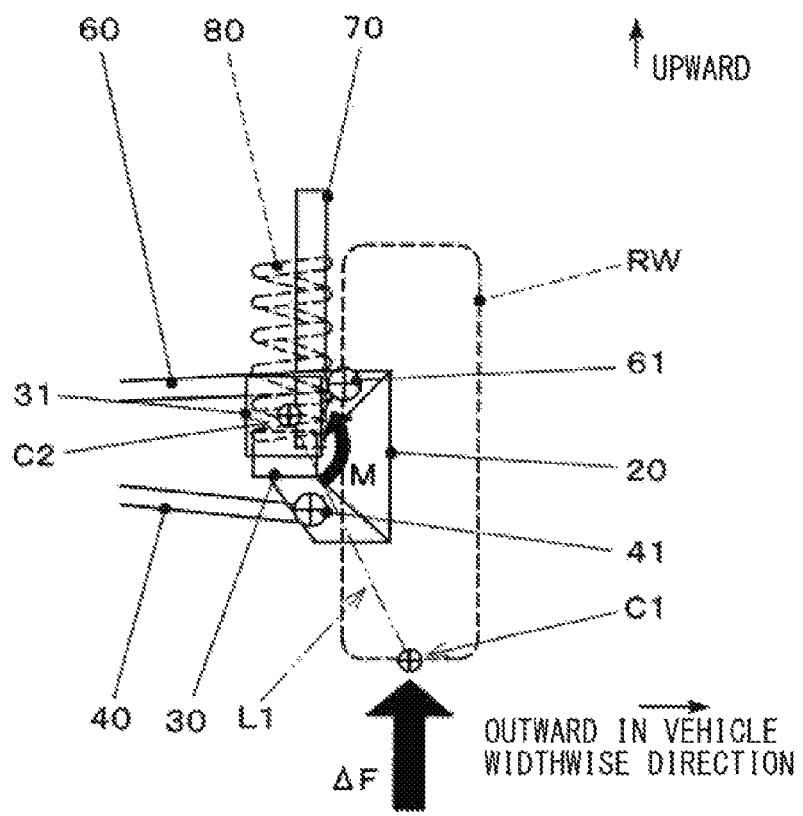
FIG. 3 is a schematic front view of the suspension according to the embodiment, as viewed from forward of the vehicle.

FIG. 3 is a schematic front view of the suspension of the embodiment, as viewed from forward of the vehicle.

The suspension 1 supports a rear wheel RW. The suspension 1 may include, for example, a rear subframe 10, a housing 20, a radius arm 30, a front lateral link 40, a rear lateral link 50, an upper link 60, a shock absorber 70, and a spring 80.

The rear subframe 10 is attached to an underside of a rear part of an unillustrated vehicle body. The rear subframe 10 is a member that serves as a base of the suspension 1.

The rear subframe 10 may include, for example, a front member 11, a rear member 12, a side member 13, a front bush 14, a rear bush 15, a front lateral link bracket 16, and an upper link bracket 17.

The front member 11 is a beam-shaped member provided in a front part of the rear subframe 10 and extended in the vehicle widthwise direction.

The rear member 12 is a beam-shaped member provided in a rear part of the rear subframe 10 and extended in the vehicle widthwise direction.

The front member 11 and the rear member 12 are spaced apart from each other in a longitudinal direction.

On both ends of the front member 11 and the rear member 12 in the vehicle widthwise direction, cylindrical portions are provided. In the cylindrical portions, the front bush 14 and the rear bush 15 are press-fitted.

The side member 13 is a beam-shaped member extended in the vehicle longitudinal direction. The side member 13 couples a rear portion of a vehicle-widthwise middle part of the front member 11 to a front portion of a vehicle-widthwise middle part of the rear member 12.

The side member 13 is provided in a pair, in spaced relation to each other in the vehicle widthwise direction. In FIG. 1, one of the side members 13 is illustrated.

The front member 11, the rear member 12, and the side member 13 include, for example, panels of press-molded steel plates assembled and welded together. Thus, the front member 11, the rear member 12, and the side member 13 have a closed cross-section as taken on a plane orthogonal to the longitudinal direction.

The front bush 14 and the rear bush 15 are members that couple the rear subframe 10 to the unillustrated vehicle body, with an elastic body such as rubber in between. The elastic body has an anti-vibration effect.

The front bush 14 is provided on both ends of the front member 11 in the vehicle widthwise direction.

The rear bush 15 is provided on both ends of the rear member 12 in the vehicle widthwise direction.

The front bush 14 and the rear bush 15 may each include, for example, a cylindrical rubber bush. The cylindrical rubber bush is disposed with its central axis aligned with the vertical direction.

The front bush 14 and the rear bush 15 may each include, for example, an inner cylinder and an outer cylinder disposed in a concentric double-tube shape, with rubber filling space therebetween. The rubber is vulcanization-bonded to between the inner cylinder and the outer cylinder.

The outer cylinders of the front bush 14 and the rear bush 15 are press-fitted into the cylindrical portions on both ends of the front member 11 and the rear member 12.

The inner cylinders of the front bush 14 and the rear bush 15 are fastened to the vehicle body, by mechanical fastening, e.g., with the use of bolts.

The front lateral link bracket 16 is a base to which a front inner bush 42 of the front lateral link 40 is attached.

The front lateral link bracket 16 protrudes vehicle-widthwise outwardly from an underside of a longitudinally middle part of the side member 13.

The upper link bracket 17 is a base to which an upper inner bush 62 of the upper link 60 is attached.

The upper link bracket 17 protrudes vehicle-widthwise outwardly from an upside of the longitudinally middle part of the side member 13.

Strictly, the rear subframe 10 exhibits a minute displacement with respect to the vehicle body because of elastic deformation of the front bush 14 and the rear bush 15. However, in the specification and the claims, the rear subframe 10 is considered as a part of the vehicle body, i.e., a bracket where components such as links of the suspension 1 are attached to the vehicle body.

The housing 20 is a hub knuckle, i.e., a member that houses and holds an unillustrated hub bearing. The hub bearing rotatably supports an unillustrated hub to which the rear wheel RW is fastened.

The housing 20 is strokably supported in a direction in which the rear wheel RW moves vertically with respect to the vehicle body, by the radius arm 30, the front lateral link 40, the rear lateral link 50, and the upper link 60 described below.

The radius arm 30 is an arm-shaped member unitized with the housing 20. The radius arm 30 protrudes from a front part of the housing 20 toward front of the vehicle.

On a front end of the radius arm 30, a radius arm bush 31 is provided.

The radius arm bush 31 may include, for example, an elastic bush such as a cylindrical rubber bush having the central axis aligned with the vehicle widthwise direction.

The radius arm bush 31 includes an inner cylinder 311 and an outer cylinder 312. The outer cylinder 312 is fixed to the front end of the radius arm 30. The inner cylinder 311 is fastened to the unillustrated vehicle body at a position forward of a front edge of the rear wheel RW.

The radius arm 30 and the housing 20 are swingable with respect to the vehicle body about the central axis of the radius arm bush 31.

As illustrated in FIG. 2, in a steady state of the vehicle, or a so-called 1G state, the center C2 of the radius arm bush 31 is disposed at a higher position than the rotatory center of the rear wheel RW.

As illustrated in FIGS. 1 and 3, the center C2 of the radius arm bush 31 is disposed vehicle-widthwise inwardly of a wheel center contact point C1 of the rear wheel RW with an unillustrated road surface. In the following, the wheel center contact point C1 with the road surface is also simply called the wheel center contact point C1.

In the specification and the claims, the center of the radius arm bush 31 means the center of rigidity, i.e., the rigidity center. With the configuration of the radius arm bush 31 of this embodiment, the rigidity center coincides with the axial center of the inner cylinder 311 and the outer cylinder 312 of the radius arm bush 31.

The configuration of the radius arm bush 31 is described in detail below.

The front lateral link 40 is a link, or a suspension arm, extended in the vehicle widthwise direction between an underside of the front part of the housing 20 and the front lateral link bracket 16 of the rear subframe 10.

In the specification and the claims, the term "extended in the vehicle widthwise direction" is not limited to a case where a longitudinal direction of each link strictly coincides with the vehicle widthwise direction, but includes a case where the longitudinal direction of each link is inclined to the vehicle widthwise direction.

The front lateral link 40 is disposed, with both ends spaced apart in the vehicle widthwise direction.

An end of the front lateral link 40 on side on which the housing 20 is disposed is swingably coupled to the underside of the front part of the housing 20, with a front outer bush 41 in between.

An end of the front lateral link 40 on side on which the rear subframe 10 is disposed is swingably coupled to the front lateral link bracket 16, with the front inner bush 42 in between.

The front lateral link 40 is disposed forwardly of the rotatory center of the rear wheel RW.

The rear lateral link 50 is a link extended in the vehicle widthwise direction between an underside of a rear part of the housing 20 and an unillustrated bracket provided in an underside of the rear member 12 of the rear subframe 10.

The rear lateral link 50 is disposed, with both ends spaced apart in the vehicle widthwise direction.

An end of the rear lateral link 50 on the side on which the housing 20 is disposed is swingably coupled to the underside of the rear part of the housing 20, with a rear outer bush 51 in between.

An end of the rear lateral link 50 on the side on which the rear subframe 10 is disposed is swingably coupled to the underside of the rear member 12, with a rear inner bush 52 in between.

The rear lateral link 50 is disposed rearwardly of the rotatory center of the rear wheel RW.

The front lateral link 40 and the rear lateral link 50 are configured to perform, for example, positioning of a toe angle of the rear wheel RW.

The rear lateral link 50 is lengthened with respect to the front lateral link 40. This imparts a roll steering characteristic to the suspension 1. The roll steering characteristic means that the rear wheel RW is steered in a toe-in direction during a bumpwise stroke of the suspension 1, or a shrinkwise stroke.

The upper link 60 is a link extended in the vehicle widthwise direction between an upside of the housing 20 and the upper link bracket 17 of the rear subframe 10.

The upper link 60 is disposed, with both ends spaced apart in the vehicle widthwise direction.

An end of the upper link 60 on the side on which the housing 20 is disposed is swingably coupled to the upside of the housing 20, with an upper outer bush 61 in between.

An end of the upper link 60 on the side on which the rear subframe 10 is disposed is swingably coupled to the upper link bracket 17, with the upper inner bush 62 in between.

The upper link 60 is disposed at a position in the vehicle longitudinal direction upward of the rotatory center of the rear wheel RW.

The upper link 60 is configured to perform, for example, positioning of a camber angle of the rear wheel RW in cooperation with the front lateral link 40 and the rear lateral link 50.

Each of the outer bushes and the inner bushes described above may include, for example, an elastic bush such as a cylindrical rubber bush having a central axis aligned with the vehicle longitudinal direction.

For example, each of the outer bushes and the inner bushes may include an outer cylinder and an inner cylinder, with an elastic material such as rubber filing space therebetween. The elastic material such as rubber is vulcanization-bonded to between an inner circumferential surface of the outer cylinder and an outer circumferential surface of the inner cylinder. The outer cylinder is press-fitted into a cylindrical portion provided in each link. The inner cylinder is fastened to the rear subframe 10 or the housing 20.

The shock absorber 70 is a damping element configured to generate a damping force during a stroke of the suspension 1. The damping force increases in accordance with an increase in a stroke speed, i.e., an expansion or shrink speed.

The shock absorber 70 may include, for example, a hydraulic shock absorber including an orifice through which hydraulic oil passes during a stroke.

An upper end 71 of the shock absorber 70 is attached to, for example, the vehicle body, with an anti-vibration rubber mount in between.

A lower end 72 of the shock absorber 70 is swingably coupled to, for example, the housing 20, with an elastic bush such as a cylindrical rubber bush in between.

The spring 80 is a spring element configured to generate a reaction force corresponding to an amount of stroke of the suspension 1.

The spring 80 may include, for example, a compression coil spring.

The spring 80 is disposed rearwardly of the shock absorber 70, with a line of axis of expansion and shrink aligned with the vertical direction. The line of axis of expansion and shrink of the spring 80 is the center of coil winding.

An upper end and a lower end of the spring 80 abut on unillustrated spring sheets provided respectively on the vehicle body and on the rear lateral link 50.

In the following, description is given of more details of the configuration of the radius arm bush 31 in this embodiment.

Figure 4:
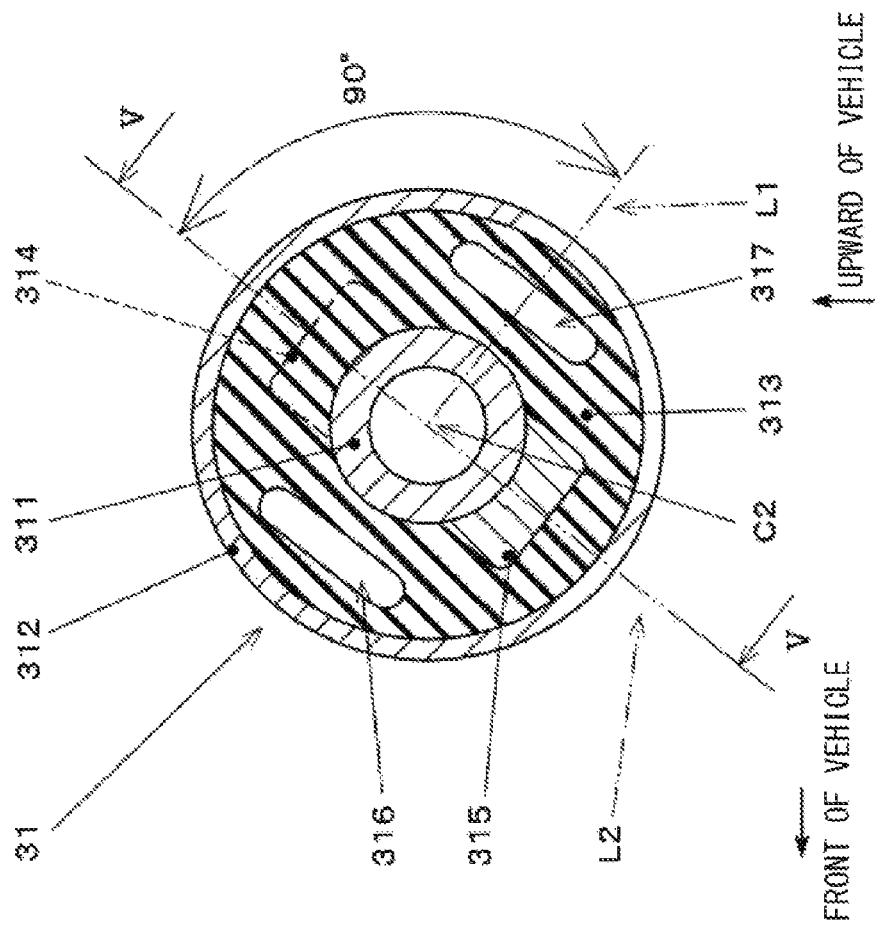
FIG. 4 is a cross-sectional view of a radius arm bush provided in the suspension according to the embodiment.

FIG. 4 is a cross-sectional view of the radius arm bush provided in the suspension of this embodiment.

Figure 5:
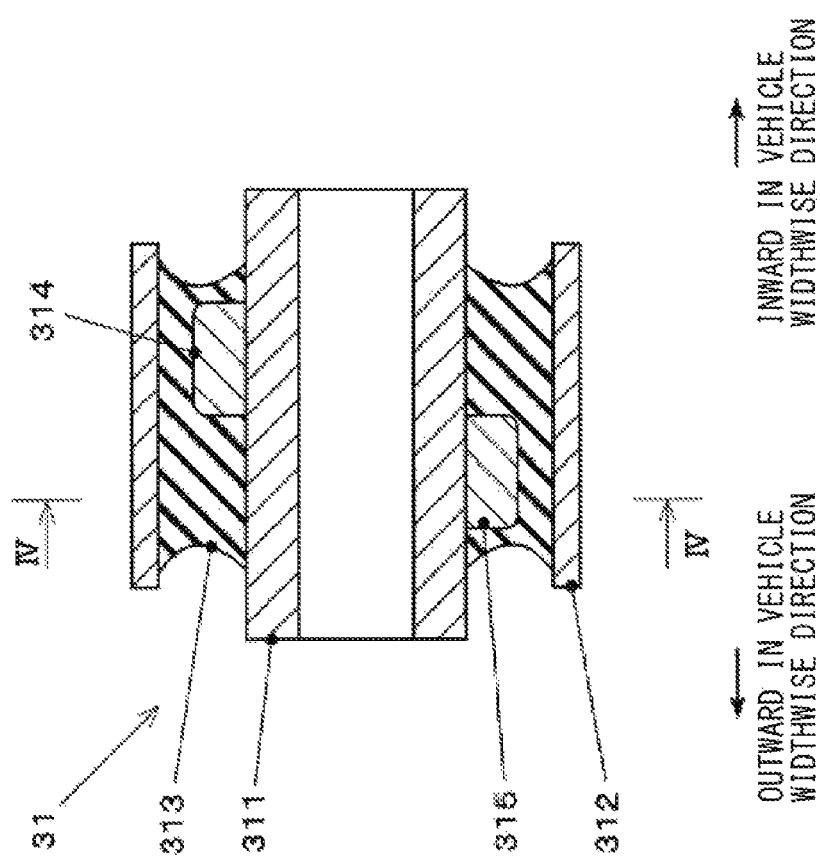
FIG. 5 is a cross-sectional view taken along the line V-V in FIG. 4, looking in the direction of the appended arrows.

FIG. 5 is a cross-sectional view taken along the line V-V in FIG. 4, looking in the direction of the appended arrows.

FIG. 4 is a cross-sectional view of the radius arm bush 31 taken on a plane orthogonal to the vehicle widthwise direction. FIG. 4 illustrates a cross-section taken through a lower protrusion 315 described later. In other words, FIG. 4 is a cross-sectional view taken along the line IV-IV in FIG. 5, looking in the direction of the appended arrows.

The radius arm bush 31 includes, for example, the inner cylinder 311, the outer cylinder 312, an elastic body 313, an upper protrusion 314, the lower protrusion 315, a front cavity 316, and a rear cavity 317.

The inner cylinder 311 is a cylindrical member.

The inner cylinder 311 includes, for example, a metal material such as steel, or a harder material, or a material of higher hardness, having a higher elastic modulus than the elastic body 313, e.g., engineering plastic.

The inner cylinder 311 is fastened to an unillustrated bracket by mechanical fastening, e.g., with the use of bolts and nuts. The unillustrated bracket protrudes downward from an unillustrated side frame of the vehicle body.

The inner cylinder 311 is disposed, with its central axis aligned with the vehicle width direction.

The outer cylinder 312 is a cylindrical member having an inner diameter larger than an outer diameter of the inner cylinder 311.

The outer cylinder 312 includes, for example, a metal material such as steel, or a harder material, or a material of higher hardness, having a higher elastic modulus than the elastic body 313, e.g., engineering plastic.

The inner cylinder 311 is inserted into inside the inner circumferential surface of the outer cylinder 312.

The outer circumferential surface of the inner cylinder 311 and the inner circumferential surface of the outer cylinder 312 are spaced apart from each other in their radial directions.

The inner cylinder 311 may be disposed concentrically with the outer cylinder 312 in a neutral state in which no load is applied to the radius arm bush 31.

Both ends of the inner cylinder 311 in an axial direction are disposed to protrude in the axial direction of the inner cylinder 311 from both ends of the outer cylinder 312.

The outer cylinder 312 is fixed to the front end of the radius arm 30.

The outer cylinder 312 may be press-fitted into and fixed to a cylindrical portion provided on the front end of the radius arm 30, for example.

The outer cylinder 312 is disposed, with its central axis aligned with the vehicle widthwise direction in the steady state of the vehicle. The steady state of the vehicle is a state without any remarkable behavior such as pitch, roll, bounce.

The elastic body 313 fills the space between the outer circumferential surface of the inner cylinder 311 and the inner circumferential surface of the outer cylinder 312.

The elastic body 313 includes a softer material, or a material of lower hardness, having a lower elastic modulus than the material of the inner cylinder 311 and the outer cylinder 312.

The elastic body 313 may include, for example, a rubber-based material such as synthetic rubber or natural rubber, or various materials having elasticity such as an elastomer or urethane.

For example, in a case with the use of a synthetic rubber-based material, the elastic body 313 may be formed by putting unvulcanized fluidic rubber into the space between the outer circumferential surface of the inner cylinder 311 and the inner circumferential surface of the outer cylinder 312 and heating the rubber for vulcanization. At this occasion, the elastic body 313 is vulcanization-bonded to each of the inner cylinder 311 and the outer cylinder 312.

The upper protrusion 314 and the lower protrusion 315 may be block-shaped members protruding from the outer circumferential surface of the inner cylinder 311.

The upper protrusion 314 and the lower protrusion 315 may include, for example, a harder material having a higher elastic modulus than the material of the elastic body 313, e.g., an engineering plastic or a metal material.

The upper protrusion 314 and the lower protrusion 315 may be formed as separate parts from the inner cylinder 311 and fixed to the inner cylinder 311.

The upper protrusion 314 and the lower protrusion 315 may be unitized with the inner cylinder 311.

The upper protrusion 314 and the lower protrusion 315 are provided in advance on the inner cylinder 311 before the material of the elastic body 313, e.g., the unvulcanized rubber, fills the space between the inner cylinder 311 and the outer cylinder 312. Thus, the upper protrusion 314 and the lower protrusion 315 are embedded in the elastic body 313. Surfaces of the upper protrusion 314 and the lower protrusion 315 are vulcanization-bonded to the elastic body 313.

A portion of the elastic body 313 is interposed between tips of the upper protrusion 314 and the lower protrusion 315, and the inner circumferential surface of the outer cylinder 312. The tips of the upper protrusion 314 and the lower protrusion 315 are upsides of the upper protrusion 314 and the lower protrusion 315 protruding from the inner cylinder 311. However, a thickness of the interposed portion of the elastic body 313 in a radial direction of the inner cylinder 311 is locally reduced with respect to other portions.

Here, the reference characters C1 denotes the wheel center contact point of the rear wheel RW. The reference characters C2 denotes the center of the radius arm bush 31. The center of the radius arm bush 31 is the rigidity center but coincides with the axial center of the inner cylinder 311, or the vehicle-widthwise midpoint of the inner cylinder 311. The reference characters L1 denotes a straight line coupling the wheel center contact point C1 of the rear wheel RW and the center C2 of the radius arm bush 31. The straight line L1 serves as a central axis of torsional turn of the radius arm 30 in accordance with the variations in the vertical load on the tire of the rear wheel RW.

As illustrated in FIG. 4, the upper protrusion 314 and the lower protrusion 315 are disposed to be aligned with a straight line that passes through the center C2 of the radius arm bush 31 and is orthogonal to the straight line L1, as viewed in the axial direction of the inner cylinder 311, i.e., as viewed in the vehicle widthwise direction.

The upper protrusion 314 is provided in a region upward of the straight line L1.

The lower protrusion 315 is provided in a region downward of the straight line L1.

Because the straight line L1 is inclined to lower toward rear of the vehicle, the upper protrusion 314 is disposed, with its center position offset rearward of the central axis of the inner cylinder 311. The lower protrusion 315 is disposed, with its center position offset forward of the central axis of the inner cylinder 311.

As illustrated in FIG. 5, the upper protrusion 314 is provided in a region vehicle-widthwise inward of the axial center of the inner cylinder 311. The axial center of the inner cylinder 311 is the vehicle widthwise midpoint of the inner cylinder 311.

The lower protrusion 315 is provided in a region vehicle-widthwise outward of the axial center of the inner cylinder 311.

As illustrated in FIG. 4, the front cavity 316 and the rear cavity 317 are hollows, or bores, that extend through the elastic body 313 in an axial direction of the radius arm bush 31.

The front cavity 316 and the rear cavity 317 each have, for example, a planar shape of an ellipse, as viewed in the axial direction of the radius arm bush 31, having a long-axis direction orthogonal to a radial direction of the radius arm bush 31.

As viewed in the axial direction of the radius arm bush 31, the front cavity 316 is positioned, or phased, around the central axis of the inner cylinder 311, between the upper protrusion 314 and the lower protrusion 315, and in a region on front side of the vehicle.

The center of the front cavity 316 is disposed upward and forward of the central axis of the inner cylinder 311.

As viewed in the axial direction of the radius arm bush 31, the rear cavity 317 is positioned, or phased, around the central axis of the inner cylinder 311, between the upper protrusion 314 and the lower protrusion 315, and in a region on rear side of the vehicle.

The center of the rear cavity 317 is disposed downward and rearward of the central axis of the inner cylinder 311.

The front cavity 316 and the rear cavity 317 are disposed to be aligned with the straight line L1, as viewed in the axial direction of the radius arm bush 31.

With the configuration described above, in the state illustrated in FIG. 5, the radius arm bush 31 has higher torsional rigidity with respect to clockwise turn of the outer cylinder 312, with the inner cylinder 311 fixed, than torsional rigidity with respect to counterclockwise turn of the outer cylinder 312. Clockwise means a direction in which the protrusions 314 and 315 are compressed.

Moreover, in the state illustrated in FIG. 4, the radius arm bush 31 has lower rigidity in a case where the inner cylinder 311 is fixed and the outer cylinder 312 is displaced in an obliquely longitudinal direction along the straight line L1, than rigidity without the front cavity 316 and the rear cavity 317.

In the following, description is given of workings and effects of the suspension 1 of this embodiment including the radius arm bush 31 as described above.

At a start of cornering of the vehicle, first, a steering angle is generated on a front wheel by, for example, a steering operation by a driver who drives the vehicle. Thereupon, a slip angle is given to a front wheel tire, and the front wheel tire generates a lateral force, i.e., a cornering force, corresponding to the slip angle.

The cornering force acting on the front wheel causes yaw behavior of the vehicle body, or rotation about a vertical axis. A part of the force generated by the front wheel is transmitted to the suspension 1 on side on which the rear wheel RW is disposed, while involving torsion of the vehicle body.

Immediately after the start of the cornering of the vehicle, the suspension 1 on the side on which the rear wheel RW is disposed is in a stuck state in which friction of, for example, the shock absorber 70 inhibits behavior in a stroke direction.

In this state, an increase in the vertical load on the tire of the rear wheel RW on outer wheel side of the cornering causes a toe change called vertical force steering in the rear wheel RW because of geometric displacement, or geometry, and rigidity balance of the links of the suspension 1.

In the geometry of the suspension 1 of this embodiment, as illustrated in FIGS. 1 and 3, the wheel center contact point C1 of the rear wheel RW is disposed vehicle-widthwise outwardly of the center C2 of the radius arm bush 31.

Accordingly, on the outer wheel side at the start of the cornering of the vehicle, as illustrated in FIG. 3, an increase ΔF in the vertical load on the tire causes a rotatory moment M in the radius arm 30 around the straight line L1 coupling the wheel center contact point C1 of the rear wheel RW and the center C2 of the radius arm bush 31. The rotatory moment M is generated in a direction in which the underside of the radius arm 30 is displaced vehicle-widthwise outwardly from the upside of the radius arm 30.

In a case with considerable torsional behavior of the whole radius arm 30 and the whole housing 20, this rotatory moment M causes an increase in the toe change of the rear wheel RW in the toe-out direction at the start of the cornering, or the vertical force steering.

Generally, in a suspension for a rear wheel, roll behavior of a vehicle occurs, causing a shrinkwise stroke, or a bumpwise stroke, of a suspension on the outer wheel side. Thereupon, a toe change in a toe-in direction, i.e., roll steering, occurs, depending on setting of, for example, lengths and angles of the front lateral link 40 and the rear lateral link 50.

To allow the tire of the rear wheel RW to generate a lateral force, i.e., a cornering force, causing the vehicle to corner, the rear wheel RW on the outer wheel side has to toe in appropriately, generating a slip angle.

However, in a case with a large toe change in the toe-out direction because of the vertical force steering mentioned above, there occurs a long delay in the response until the rear wheel RW on the outer wheel side makes the toe change in the toe-in direction.

In contrast, in this embodiment, the upper protrusion 314 and the lower protrusion 315 are provided. This makes it possible to allow the radius arm bush 31 to have the higher rigidity with respect to the turn in the direction in which the underside of the radius arm 30 is displaced vehicle-widthwise outwardly from the upside of the radius arm 30, than the rigidity with respect to reverse turn. The reverse turn means turn in the direction in which the underside of the radius arm 30 is displaced vehicle-widthwise inwardly from the upside of the radius arm 30.

Thus, in the rear wheel RW on the outer wheel side on which the vertical load on the tire increases, it is possible to suppress the turn in the direction in which the underside of the radius arm 30 is displaced vehicle-widthwise outwardly from the upside, i.e., in the direction of the rotatory moment M illustrated in FIG. 3. Hence, it is possible to suppress the toe change in the toe-out direction at the initial stage of the cornering, and advance the time when the toe change in the toe-in direction occurs. This leads to reduction in the delay in the response of the vehicle to the steering operation.

Meanwhile, in the rear wheel RW on inner wheel side on which the vertical load on the tire decreases, the turn in the direction in which the underside of the radius arm 30 is displaced vehicle-widthwise inwardly from the upside, i.e., in the reverse direction to the rotatory moment M illustrated in FIG. 3, is less likely to be inhibited. Hence, it is possible to promote the toe change in the toe-out direction, leading to effective utilization of a grip force of the tire.

As described, according to this embodiment, it is possible to obtain the following effects.

(1) On the outer wheel side of the cornering, as the vertical load on the tire increases, the radius arm 30 makes the torsional turn accompanied by the toe change in the toe-out direction, i.e., the vertical force steering. Suppressing such torsional turn makes it possible to advance the toe change in the toe-in direction by the roll steering. This leads to reduction in the time delay in the response of the vehicle behavior to the driver's operation of the steering wheel.

Hence, it is possible to accelerate the cycle of the operation, the response, and the correction operation between the driver and the vehicle, leading to enhanced operation accuracy.

On the inner wheel side of the cornering, as the vertical load on the tire decreases, the radius arm 30 makes the torsional turn accompanied by the toe change in the toe-in direction. Permitting such toe change in the toe-in direction makes it possible to promote the toe change in the toe-out direction, leading to effective utilization of the grip of the tire on the inner wheel side.

(2) The radius arm bush 31 may include the upper protrusion 314 and the lower protrusion 315 between the outer circumferential surface of the inner cylinder 311 and the inner circumferential surface of the outer cylinder 312. The upper protrusion 314 and the lower protrusion 315 include the harder material than the elastic body 313. The upper protrusion 314 is provided in the region upward and vehicle-widthwise inward of the straight line L1. The lower protrusion 315 is provided in the region downward and vehicle-widthwise outward of the straight line L1. Hence, it is possible to effectively enhance the rigidity of the elastic body 313 against the deformation in the direction in which the protrusions 314 and 315 are compressed.

Moreover, for example, the arrangement and the shapes of the upper protrusion 314 and the lower protrusion 315 makes it possible to easily set the direction of deformation in which the rigidity increases, and an amount of increase in the rigidity.

(3) The upper protrusion 314 and the lower protrusion 315 may protrude from the outer circumferential surface of the inner cylinder 311. This makes it possible to easily manufacture the radius arm bush 31 having the characteristic mentioned above, by filling the space between the inner cylinder 311 and the outer cylinder 312 with the material of the elastic body 313 and vulcanizing the material of the elastic body 313. Non-limiting examples of the material of the elastic body 313 may include unvulcanized fluidic rubber.

(4) The elastic body 313 of the radius arm bush 31 may have the cavities 316 and 317, as viewed in the direction of the central axis of the inner cylinder 311. The cavities 316 and 317 are spaced apart from the upper protrusion 314 and the lower protrusion 315 in the circumferential direction of the inner cylinder 311. Hence, it is possible to lower supporting rigidity of the radius arm 30 in the longitudinal direction, and provide a comfortable ride of the vehicle.

Moreover, it is possible to lower supporting rigidity of the radius arm 30 in the direction of stroke of the suspension 1, i.e., torsional rigidity around the central axis of the inner cylinder 311. This leads to the smoother motion of the suspension 1.

As described, according to the embodiment, it is possible to provide a suspension that makes it possible to enhance responsiveness at an initial stage of cornering.

MODIFICATION EXAMPLES

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the suspension and the vehicle are not limited to the forgoing embodiments, but may be changed as appropriate.

For example, the shapes, the structures, the materials, the manufacturing methods, the arrangements, and the quantities of the members constituting the suspension and the vehicle are not limited to the forgoing embodiments, but may be changed as appropriate.

For example, in the forgoing embodiments, the radius arm bush is disposed, with the central axes of the inner cylinder and the outer cylinder aligned with the vehicle widthwise direction. However, the radius arm bush may have a configuration in which the central axes of the inner cylinder and the outer cylinder have inclinations small enough not to diminish the effects of the embodiments.

Moreover, there are no particular limitations on configuration of other links than the radius arm in the suspension. For example, multiple upper links may be disposed in longitudinally spaced relation.

Furthermore, there are no particular limitations on positions of the shock absorber and the spring.

(2) In the embodiments, the protrusions are provided that protrude from the outer circumferential surface of the inner cylinder. In one embodiment of the disclosure, the protrusions may serve as "one or more deformation resistant members". However, a configuration of the deformation resistant members is not limited to the configuration described in the embodiment, but may be changed as appropriate.

For example, protrusions may be provided that protrude from the inner circumferential surface of the outer cylinder.

In another example, a harder material than the elastic body may be embedded inside the elastic body by, for example, insert molding. The deformation resistant members thus embedded may be spaced apart from both the outer circumferential surface of the inner cylinder and the inner circumferential surface of the outer cylinder.

Furthermore, in the embodiments, the radius arm bush includes both the upper protrusion and the lower protrusion, but the radius arm bush may include either the upper protrusion or the lower protrusion.

(3) In the embodiments, the rear subframe includes, for example, assembled panels of press-molded steel plates, but the rear subframe may be provided by other manufacturing methods.

For example, the rear subframe may be formed by hydroforming. Hydroforming includes applying hydraulic pressure such as water pressure to an inside of a metal hollow body to cause plastic deformation. Alternatively, the rear subframe may include, for example, an extruded material of an aluminum-based alloy.

In another alternative, without the use of the rear subframe, some or all of the suspension links may be coupled to, for example, the vehicle body, or a cross member rigidly coupled to the vehicle body.

(4) In the embodiment, the bushes of each link of the suspension include, for example, cylindrical rubber bushes, but the disclosure is not limited thereto. For example, bushes including an elastic body other than rubber may be used.

Moreover, the bushes of each link of the suspension are not limited to the cylindrical bushes. Other forms of bushes such as a ball joint, or a spherical bearing, may be used.

The invention claimed is:

1. A suspension comprising:
a housing to which a hub bearing is attached, the hub bearing rotatably supporting a rear wheel of a vehicle;
links each including both ends spaced apart in a vehicle widthwise direction, the links each coupling the housing to a vehicle body of the vehicle;
a radius arm unitized with the housing and protruding from the housing toward front of the vehicle; and
a radius arm bush provided on a front end of the radius arm, the radius arm bush coupling the radius arm to the vehicle body, with an elastic body in between, the radius arm bush being disposed vehicle-widthwise inwardly of a wheel center contact point of the rear wheel, wherein the radius arm bush comprises:
an inner cylinder including both ends spaced apart in the vehicle widthwise direction, the inner cylinder being fixed to one of the vehicle body and the radius arm;
an outer cylinder in which the inner cylinder is inserted, the outer cylinder being fixed to another of the vehicle body and the radius arm;
the elastic body provided between an outer circumferential surface of the inner cylinder and an inner circumferential surface of the outer cylinder;
an upper deformation resistant member including a harder material than the elastic body and provided between the outer circumferential surface of the inner cylinder and the inner circumferential surface of the outer cylinder, the upper deformation resistant member being provided in an upper region upward of a first straight line when viewed from a first direction parallel to a central axis of the inner cylinder, the first straight line passing through, when viewed from the first direction, the central axis of the inner cylinder and a wheel center contact point of the rear wheel; and
a lower deformation resistant member including a harder material than the elastic body and provided between the outer circumferential surface of the inner cylinder and the inner circumferential surface of the outer cylinder, the lower deformation resistant member being provided in a lower region downward of the first straight line when viewed from the first direction,
wherein when viewed from a second direction orthogonal to the central axis of the inner cylinder, a center of the upper deformation resistant member in the first direction is located vehicle-widthwise inwardly from a center of the lower deformation resistant member in the first direction,
wherein when viewed from the second direction, a vehicle-widthwise outward end of the upper deformation resistant member in the first direction is located vehicle-widthwise inwardly from a vehicle-widthwise outward end of the elastic body in the first direction,
wherein when viewed from the second direction, a vehicle-widthwise inward end of the lower deformation resistant member in the first direction is located vehicle-widthwise outwardly from a vehicle-widthwise inward end of the elastic body in the first direction, and
wherein the radius arm bush has higher rigidity with respect to turn of the radius arm with respect to the vehicle body in a direction in which an underside of the radius arm is displaced vehicle-widthwise outwardly from an upside of the radius arm, than rigidity with respect to turn of the radius arm with respect to the vehicle body in a direction in which the underside of the radius arm is displaced vehicle-widthwise inwardly from the upside of the radius arm.

2. The suspension according to claim 1, wherein the upper and lower deformation resistant members each comprise a protrusion protruding from the outer circumferential surface of the inner cylinder and spaced apart from the inner circumferential surface of the outer cylinder.

3. The suspension according to claim 2, wherein when viewed from the first direction, the elastic body has one or more cavities spaced apart from the upper and lower deformation resistant members in a circumferential direction of the inner cylinder, and
wherein when viewed from the first direction, the one or more cavities are disposed to be aligned with the first straight line.

4. The suspension according to claim 1, wherein when viewed from the second direction, the vehicle-widthwise outward end of the upper deformation resistant member in the first direction is located vehicle-widthwise inwardly from the vehicle-widthwise inward end of the lower deformation resistant member in the first direction.

5. The suspension according to claim 1, wherein when viewed from the second direction, the vehicle-widthwise outward end of the upper deformation resistant member in the first direction is located vehicle-widthwise inwardly from a center of the elastic body in the first direction, and
wherein when viewed from the second direction, the vehicle-widthwise inward end of the lower deformation resistant member in the first direction is located vehicle-widthwise outwardly from the center of the elastic body in the first direction.

6. The suspension according to claim 1, wherein when viewed from the second direction, the vehicle-widthwise outward end of the upper deformation resistant member in the first direction is located vehicle-widthwise inwardly from a center of the inner cylinder in the first direction, and
wherein when viewed from the second direction, the vehicle-widthwise inward end of the lower deformation resistant member in the first direction is located vehicle-widthwise outwardly from the center of the inner cylinder in the first direction.

7. The suspension according to claim 1, wherein when viewed from the first direction, the upper and lower deformation resistant members are disposed to be aligned with a second straight line orthogonal to the first straight line and passing through the central axis of the inner cylinder.

8. The suspension according to claim 1, wherein when viewed from the first direction, a center of the upper deformation resistant member in a vehicle longitudinal direction is located rearward of the central axis of the inner cylinder, and
when viewed from the first direction, a center of the lower deformation resistant member in the vehicle longitudinal direction is located forward of the central axis of the inner cylinder.

9. A suspension comprising:
a housing to which a hub bearing is attached, the hub bearing rotatably supporting a rear wheel of a vehicle;
links each including both ends spaced apart in a vehicle widthwise direction, the links each coupling the housing to a vehicle body of the vehicle;
a radius arm unitized with the housing and protruding from the housing toward front of the vehicle; and
a radius arm bush provided on a front end of the radius arm, the radius arm bush coupling the radius arm to the vehicle body, with an elastic body in between, the radius arm bush being disposed vehicle-widthwise inwardly of a wheel center contact point of the rear wheel, wherein the radius arm bush comprises:
  an inner cylinder including both ends spaced apart in the vehicle widthwise direction, the inner cylinder being fixed to one of the vehicle body and the radius arm;
  an outer cylinder in which the inner cylinder is inserted, the outer cylinder being fixed to another of the vehicle body and the radius arm;
  the elastic body provided between an outer circumferential surface of the inner cylinder and an inner circumferential surface of the outer cylinder;
  an upper deformation resistant member including a harder material than the elastic body and provided between the outer circumferential surface of the inner cylinder and the inner circumferential surface of the outer cylinder, the upper deformation resistant member being provided in an upper region upward of a central axis of the inner cylinder when viewed from a first direction parallel to the central axis of the inner cylinder; and
wherein when viewed from a second direction orthogonal to the central axis of the inner cylinder, a vehicle-widthwise outward end of the upper deformation resistant member in the first direction is located vehicle-widthwise inwardly from a vehicle-widthwise outward end of the elastic body in the first direction,
wherein the radius arm bush has higher rigidity with respect to turn of the radius arm with respect to the vehicle body in a direction in which an underside of the radius arm is displaced vehicle-widthwise outwardly from an upside of the radius arm, than rigidity with respect to turn of the radius arm with respect to the vehicle body in a direction in which the underside of the radius arm is displaced vehicle-widthwise inwardly from the upside of the radius arm.

10. The suspension according to claim 9, wherein when viewed from the second direction, the vehicle-widthwise outward end of the upper deformation resistant member in the first direction is located vehicle-widthwise inwardly from a center of the elastic body in the first direction.

11. The suspension according to claim 9, wherein when viewed from the second direction, the vehicle-widthwise outward end of the upper deformation resistant member in the first direction is located vehicle-widthwise inwardly from a center of the inner cylinder in the first direction.

12. The suspension according to claim 9, wherein when viewed from the first direction, a center of the upper deformation resistant member in a vehicle longitudinal direction is located rearward of the central axis of the inner cylinder.

13. A suspension comprising:
a housing to which a hub bearing is attached, the hub bearing rotatably supporting a rear wheel of a vehicle;
links each including both ends spaced apart in a vehicle widthwise direction, the links each coupling the housing to a vehicle body of the vehicle;
a radius arm unitized with the housing and protruding from the housing toward front of the vehicle; and
a radius arm bush provided on a front end of the radius arm, the radius arm bush coupling the radius arm to the vehicle body, with an elastic body in between, the radius arm bush being disposed vehicle-widthwise inwardly of a wheel center contact point of the rear wheel,
wherein the radius arm bush comprises:
  an inner cylinder including both ends spaced apart in the vehicle widthwise direction, the inner cylinder being fixed to one of the vehicle body and the radius arm;
  an outer cylinder in which the inner cylinder is inserted, the outer cylinder being fixed to another of the vehicle body and the radius arm;
  the elastic body provided between an outer circumferential surface of the inner cylinder and an inner circumferential surface of the outer cylinder;
  a lower deformation resistant member including a harder material than the elastic body and provided between the outer circumferential surface of the inner cylinder and the inner circumferential surface of the outer cylinder, the lower deformation resistant member being provided in a lower region downward of a central axis of the inner cylinder when viewed from a first direction parallel to the central axis of the inner cylinder; and
wherein when viewed from a second direction orthogonal to the central axis of the inner cylinder, a vehicle-widthwise inward end of the lower deformation resistant member in the first direction is located vehicle-widthwise outwardly from a vehicle-widthwise inward end of the elastic body in the first direction,
wherein the radius arm bush has higher rigidity with respect to turn of the radius arm with respect to the vehicle body in a direction in which an underside of the radius arm is displaced vehicle-widthwise outwardly from an upside of the radius arm, than rigidity with respect to turn of the radius arm with respect to the vehicle body in a direction in which the underside of the radius arm is displaced vehicle-widthwise inwardly from the upside of the radius arm.

14. The suspension according to claim 13, wherein when viewed from the second direction, the vehicle-widthwise inward end of the lower deformation resistant member in the first direction is located vehicle-widthwise outwardly from a center of the elastic body in the first direction.

15. The suspension according to claim 13, wherein when viewed from the second direction, the vehicle-widthwise inward end of the lower deformation resistant member in the first direction is located vehicle-widthwise outwardly from a center of the inner cylinder in the first direction.

16. The suspension according to claim 13, wherein when viewed from the first direction, a center of the lower deformation resistant member in a vehicle longitudinal direction is located forward of the central axis of the inner cylinder.

* * * * *